(12) United States Patent
Subbarao

(10) Patent No.: US 7,827,469 B2
(45) Date of Patent: *Nov. 2, 2010

(54) METHOD OF IMPLEMENTING XOR BASED RAID ALGORITHMS

(75) Inventor: Sanjay Subbarao, Irvine, CA (US)

(73) Assignee: ADPT Corporation, Milpitas, CA (US)

( * ) Notice: Subject to any disclaimer, the term of this patent is extended or adjusted under 35 U.S.C. 154(b) by 13 days.

This patent is subject to a terminal disclaimer.

(21) Appl. No.: 12/332,185

(22) Filed: Dec. 10, 2008

(65) Prior Publication Data

US 2009/0094479 A1 Apr. 9, 2009

Related U.S. Application Data

(62) Division of application No. 11/010,435, filed on Dec. 14, 2004, now abandoned.

(60) Provisional application No. 60/571,884, filed on May 18, 2004.

(51) Int. Cl.
  *G11C 29/00* (2006.01)
  *H03M 13/00* (2006.01)
(52) U.S. Cl. .................... 714/770; 714/769
(58) Field of Classification Search ............. 714/769, 714/770
  See application file for complete search history.

(56) References Cited

U.S. PATENT DOCUMENTS

| | | | |
|---|---|---|---|
| 5,134,619 A | | 7/1992 | Henson et al. |
| 5,499,253 A | | 3/1996 | Lary |
| 5,574,851 A | * | 11/1996 | Rathunde .................. 714/7 |
| 5,784,393 A | * | 7/1998 | Byers et al. ............. 714/800 |
| 5,790,775 A | * | 8/1998 | Marks et al. .............. 714/9 |
| 6,085,333 A | * | 7/2000 | DeKoning et al. ........... 714/7 |
| 6,101,615 A | | 8/2000 | Lyons |
| 6,112,255 A | | 8/2000 | Dunn et al. |
| 6,185,652 B1 | * | 2/2001 | Shek et al. ............... 710/263 |
| 6,311,320 B1 | * | 10/2001 | Jibbe ..................... 717/111 |
| 6,327,672 B1 | | 12/2001 | Wilner |
| 6,453,428 B1 | | 9/2002 | Stephenson |
| 6,513,098 B2 | | 1/2003 | Allingham |
| 6,567,891 B2 | * | 5/2003 | Oldfield et al. ............. 711/114 |
| 6,622,302 B1 | * | 9/2003 | Delaney et al. ............. 717/170 |
| 6,687,872 B2 | * | 2/2004 | Oldfield et al. ............. 714/801 |
| 6,760,862 B1 | * | 7/2004 | Schreiber et al. ............ 714/15 |
| 6,766,480 B2 | * | 7/2004 | Oldfield et al. ............. 714/52 |
| 6,792,505 B2 | * | 9/2004 | Otterness et al. ............ 711/114 |
| 6,912,676 B1 | | 6/2005 | Gusier et al. |
| 7,062,702 B2 | * | 6/2006 | Jacobson ................ 714/800 |
| 7,080,199 B2 | | 7/2006 | Yang |
| 7,111,227 B2 | * | 9/2006 | Oldfield et al. ............. 714/801 |
| 7,167,915 B2 | * | 1/2007 | Bendich et al. ............. 709/224 |

(Continued)

*Primary Examiner*—Joseph D Torres
(74) *Attorney, Agent, or Firm*—Dickstein Shapiro LLP

(57) ABSTRACT

An interpretive script language that provides an abstraction layer between redundant array of independent disks (RAID) algorithms and RAID hardware architecture. The interpretive script language provides greater flexibility and performance over conventional RAID processors. The interpretive script language may be used with any RAID hardware architecture, is not dependent on a specific RAID algorithm, and enables efficient communication to a RAID processor from any entity that desires RAID services. The entity requesting RAID services sends a command to a RAID processor, which includes pointers to a script entry point for scripts stored in a table memory in the RAID processor, and pointers to the data and parity (for example, in a buffer memory) on which to perform exclusive OR (XOR) operations.

9 Claims, 2 Drawing Sheets

U.S. PATENT DOCUMENTS

| | | | |
|---|---|---|---|
| 7,212,369 B1 * | 5/2007 | Levy et al ..................... | 360/75 |
| 7,246,259 B2 * | 7/2007 | Subbarao et al. ............... | 714/6 |
| 7,376,756 B2 * | 5/2008 | Delaney et al. ................ | 710/5 |
| 7,412,563 B2 * | 8/2008 | Subbarao et al. ............ | 711/114 |
| 7,555,701 B2 * | 6/2009 | Subbarao ................... | 714/781 |
| 2009/0094479 A1 * | 4/2009 | Subbarao ...................... | 714/6 |

* cited by examiner

METHOD OF IMPLEMENTING XOR BASED RAID ALGORITHMS

This is a divisional of U.S. application Ser. No. 11/010,435, filed Dec. 14, 2004, now abandoned, which claims the benefit of U.S. provisional application Ser. No. 60/571,884, filed May 18, 2004, the disclosure of which is herein incorporated by reference.

FIELD OF INVENTION

The present invention relates to a method and apparatus for calculating exclusive OR (XOR) operations that can be used in any disk array architecture and which is independent of hardware architecture or RAID algorithms.

BACKGROUND OF THE INVENTION

With the accelerating growth of Internet and intranet communication, high-bandwidth applications (such as streaming video), and large information databases, the need for networked storage systems has increased dramatically. System performance, data protection, and cost have been some of the main concerns in designing networked storage systems. In the past, many systems have used fibre channel drives because of their speed and reliability. However, fibre channel drives are very costly. Integrated drive electronics (IDE) drives are much cheaper in terms of dollars-per-gigabyte of storage; however, their reliability is inferior to that of fibre channel drives. Furthermore, IDE drives require cumbersome 40-pin cable connections and are not easily replaceable when a drive fails. Serial advanced technology attachment (SATA) drives that use the same receptor as their fibre channel counterparts are now available. These drives, therefore, have the speed required for acceptable system performance and are hot-swappable, meaning that failed drives are easily replaced with new ones. Furthermore, they provide more storage than do fibre channel drives and at a much lower cost. However, SATA drives do not offer the same reliability as do fibre channel drives. Thus, there is an industry push to develop high-capacity storage devices that are low cost and extremely reliable.

To improve data reliability, many computer systems implement a RAID system, which is a disk system that includes a collection of multiple disk drives that are organized into a disk array and managed by a common array controller. The array controller presents the array to the user as one or more virtual disks. Disk arrays are the framework to which RAID functionality is added in functional levels in order to produce cost-effective, highly available, high-performance disk systems.

In RAID systems, the data is distributed over multiple disk drives to allow parallel operation, and thereby enhance disk access performance, and to provide fault tolerance against drive failures. Currently, a variety of RAID levels from RAID level 0 through RAID level 6 have been specified in the industry. RAID levels 1 through 5 provide a single drive fault tolerance. That is, these RAID levels allow reconstruction of the original data, if any one of the disk drives fails. It is quite possible, however, that more than one SATA drive may fail in a RAID system. For example, dual drive failures are becoming more common, as RAID systems incorporate an increasing number of less expensive disk drives.

To provide, in part, a dual-fault tolerance to such failures, the industry has specified a RAID level 6. The RAID 6 architecture is similar to RAID 5, but RAID 6 can allocating operations that require access to the parity engines or cache memories. By providing multiple parity engines and cache memories, error correction syndrome values can be calculated in parallel. The performance of the controller can be selectively scaled by providing a greater or lesser number of parity engines and associated cache memories. Furthermore, by use of a switched fabric internal architecture, data transfers between the internal components of the controller can be conducted simultaneously.

The '098 patent provides a RAID controller that is scalable, based on performance and cost requirements. Although this provides flexibility to the customer, such that the RAID controller is somewhat customizable, it does not provide instant or continuous flexibility, because additional hardware must be physically installed or uninstalled to change the RAID controller configuration. Hence, a method of performing parity calculations that is independent of RAID 6 hardware architecture and algorithms is still needed.

It is therefore an object of the invention to provide an improved method of calculating XOR operations for any type of RAID 6 algorithm.

It is another object of this invention to provide an improved method of calculating XOR operations for any type of RAID 6 algorithm that is independent of the hardware architecture.

SUMMARY OF THE INVENTION

The present invention is directed to an interpretative script language which may be used to define a plurality of scripts for use with any exclusive OR (XOR) based overcome the failure of any two disk drives by using an additional parity block for each row (for a storage loss of 2/N). The first parity block (P) is calculated by performing an XOR operation on a set of positionally assigned data sectors (e.g., rows of data sectors). Likewise, the second parity block (Q) is generated by using the XOR function on a set of positionally assigned data sectors (e.g., columns of data sectors). When a pair of disk drives fails, the conventional dual-fault tolerant RAID systems reconstruct the data of the failed drives by using the parity sets. The RAID systems are well known in the art and are amply described, for example, in *The RAIDbook, 6th Edition: A Storage System Technology Handbook*, edited by Paul Massiglia (1997), which is incorporated herein by reference.

One disadvantage of RAID 6 is that it is processor-intensive and requires excessive processor cycles to calculate the many parity and data addresses required to perform RAID 6. As a result, RAID controllers are becoming more complex in order to compensate for the additional processor requirements. As RAID 6 hardware architectures and algorithms become more complex, they also become increasingly vendor-specific and limit a customer's flexibility to mix and match RAID 6 systems, based on cost, performance, or other business related factors. What is needed is a flexible method of processing RAID 6 algorithms on any type of RAID 6 hardware architecture.

An example RAID 6 system is described in U.S. Pat. No. 6,513,098, entitled "Method and Apparatus for Scalable Error Correction Code Generation Performance." The '098 patent describes a scalable memory controller for use in connection with error correction code. According to the invention, the channels of the controller are interconnected to a plurality of parity engines and associated cache memories through use of a switched fabric architecture. A processor is provided for RAID algorithm. The interpretative script language provides an abstraction layer between RAID hardware and RAID algorithms. This abstraction provides greater system flexibility, as a hardware designer can make hardware changes without being concerned about the details of RAID algorithms, while a RAID algorithm designer can make algorithm changes without being concerned about the details of the RAID hardware architecture. The semantics of the interpretative script language may be incorporated into the software stack of a RAID controller, which would permit the RAID controller to generate a plurality of scripts using the interpretative script language. The scripts are preferably generated offline, for example, during system power-up, in order to minimize system overhead while the RAID controller is executing a RAID algorithm.

BRIEF DESCRIPTION OF THE DRAWINGS

The foregoing and other advantages and features of the invention will become more apparent from the detailed description of exemplary embodiments of the invention given below with reference to the accompanying drawings, in which.

DETAILED DESCRIPTION OF THE INVENTION

The interpretative script language of the present invention is provides an abstraction layer between the hardware and the RAID algorithms of a RAID system. Accordingly, the interpretative script language of the present invention is independent of the implementation details of a RAID system's hardware and algorithm. In the description below, the interpretative script language of the present invention is explained in the context of a RAID system implementing the "surviving relationships algorithm" fully described in U.S. Application Ser. No. 60/553,98 filed Mar. 18, 2004, which is hereby incorporated by reference in its entirety. However, it should be recognized that the principles of the present invention may be practiced with any RAID system utilizing exclusive OR (XOR) operations.

Figure 1:
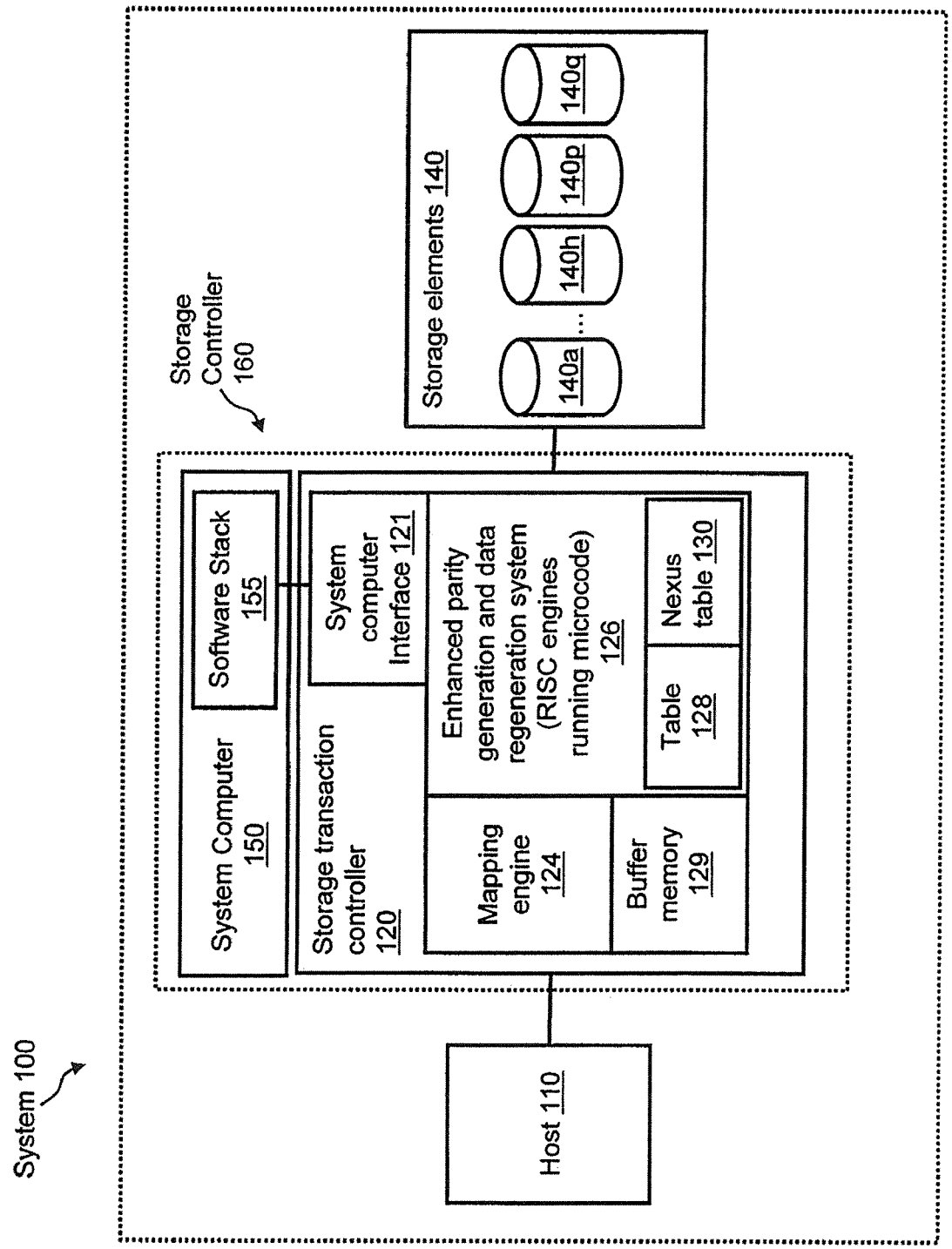
FIG. 1 is a dual parity generation and data recovery system in a networked storage system.

Now referring to the drawings, where like reference numerals designate like elements, there is shown in FIG. 1 a system 100 that includes at least one host 110, a storage controller 160, and a plurality of storage elements 140a through 140h, where 'h' is not representative of any other value 'h' described herein, 140p, which is representative of P parity data storage, and 140q, which is representative of Q parity data storage. Storage controller 160 further includes a system computer 150, a software stack 155, and a storage transaction controller 120. Storage transaction controller 120 further includes a system computer interface 121, a mapping engine 124, an enhanced parity generation and data regeneration system 126, and a buffer memory 129. Enhanced parity generation and data regeneration system 126 further includes a table 128 and a nexus table 130. Software stack 155 is responsible for initialization and configuration of storage transaction controller 120.

Host 110 is representative of any kind of mechanism that requests data reads and writes to and from storage elements 140, which may be any type of networked storage system, for example, a fibre channel or SCSI. Individual storage elements 140 may be, for example, SATA or fibre channel drives. Mapping engine 124 is a transaction processor entity that translates all host 110 requests for specific volumes into the actual logical block addresses (LBAs) in storage elements 140 for storage transaction controller 120. Storage transaction controller 120 is preferably an integrated I/O controller that is fully explained in U.S. patent application Ser. No. 09/716,195 and preferably which further includes a scalable transaction processing pipeline (not shown) that is explained in U.S. patent application Ser. No. 10/429,048, both of which are hereby incorporated by reference. However, it should be recognized that the present invention may also be practiced using other storage transaction controller architectures. System computer 150 is representative of any processor, which has an operating system and hosts software stack 155. In one exemplary embodiment, the operating system is the Linux operating system, however, the present invention may be practiced with other operating systems as well. The scripts generated by the SRA are incorporated into software stack 155. Preferably, the software stack 155 initializes table 128 with the SRA script information through system computer interface 121 at boot-up or power-on/reset.

Table 128 is any kind of memory element. Nexus table 130 is a look-up table. Nexus table 130 holds two types of nexus lists. A nexus is a list of buffer memory 129 block addresses. A longform nexus has sixty-four such block addresses and a shortform nexus has four such block addresses. Each block address represents thirty-two sectors. Thus, a nexus is a scatter-gather list that represents a consolidated buffer memory 129 resource of either 2,048 sectors (longform nexus) or 128 sectors (shortform nexus).

Figure 2:
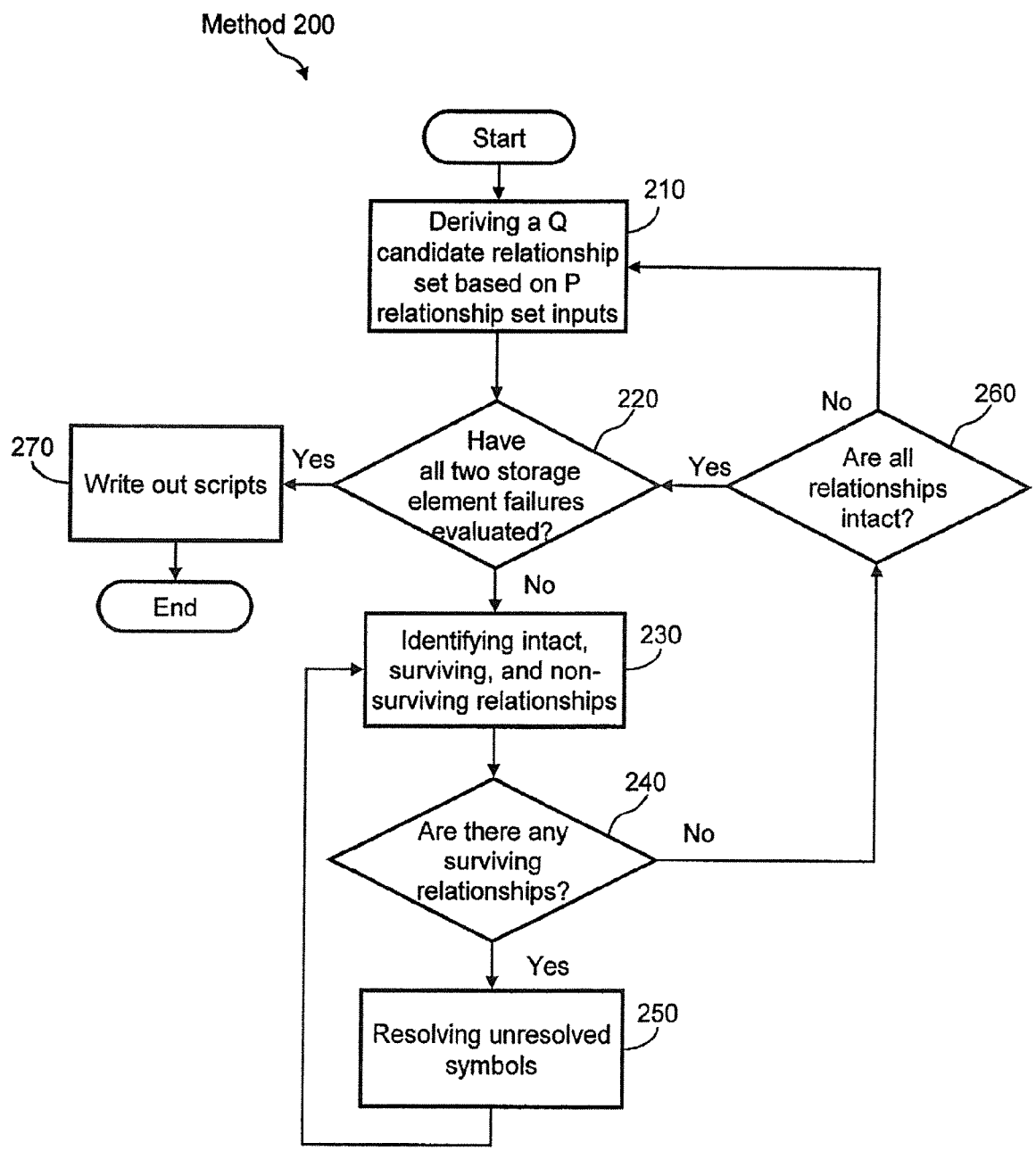
FIG. 2 is a flow diagram of a method of deriving surviving relationships.

FIG. 2 is a flow diagram of a method 200 of deriving surviving relationships. Method 200 includes the following steps:

Step 210: Deriving a Candidate Q Relationship Set Based on P Relationship Set Inputs In this step, method 200 derives a candidate Q relationship set from a P relationship seed. The symbols in the Q relationships are randomly selected from the Q parity storage element symbols, the P parity storage element symbols, and one symbol each from all but one data storage element. No two Q relationships miss the same data storage element, and no two Q relationships have a common symbol between them. This process repeats until there are as many Q relationships as the number of symbols per column. Method 200 proceeds to step 220.

Step 220: have all Two Storage Element Failure Combinations been Evaluated?

In this decision step, method 200 determines whether all two storage element failure combinations have been evaluated for this candidate Q relationship set (i.e., can all unresolved symbols be resolved for all failure combinations?). If yes, method 200 proceeds to step 270, and this Q candidate relationship set is designated as the Q relationship set; if no, initially unresolved symbols for the next two storage element failure combination are identified (32 unresolved symbols are created in any two storage element failure combinations in an 8+2 RAID architecture example) and method 200 proceeds to step 230.

Step 230: Identifying Intact, Surviving, and Non-Surviving Relationships

In this step, for the given set of unresolved symbols, method 200 identifies intact relationships, surviving relationships, and non-surviving relationships. These relationships include both P and Q relationship sets. Method 200 proceeds to step 240.

Step 240: are There any Surviving Relationships?

In this decision step, method 200 determines whether there are any surviving relationships. If yes, method 200 proceeds to step 250; if no, method 200 proceeds to step 260.

Step 250: Resolving Unresolved Symbols

In this step, method 200 expresses the unknown term as an XOR equation of resolved symbols. For example, if disk 1 symbol 2 (i.e., D[1, 2]) is an unknown term, it can be resolved by use of the following XOR equation, where '^' is equivalent to XOR:

$$D[1,2]=Q[0]\char`^D[2,6]\char`^D[3,2]\char`^D[4,0]\char`^D[5,3]\char`^D[6,7]\char`^D[7,11]\char`^P[13]$$

Therefore, D[1, 2] is resolved and becomes a known term. It should be clear to one skilled in the art that this particular step illustrates a single resolution; however, multiple resolutions are possible, if there are more surviving relationships. The set of unresolved symbols is updated to remove the newly resolved symbol (D[1, 2] for this example). Method 200 returns to step 230.

Step 260: are all Relationships Intact?

In this decision step, method 200 determines whether all the relationships are intact. If yes, method 200 determines that this candidate Q relationship set is the correct set with which to generate parity and/or data for this particular two storage element failure combination and method 200 returns to step 220; if no, method 200 returns to step 210.

Step 270: Writing Out Scripts

In this step, method 200 generates a plurality of scripts that correspond to each failure case. For each failure case (single and dual) evaluated for a successful Q candidate, the XOR equations needed to resolve all missing symbols are written out to a disk file as a script using the semantics described later. Method 200 ends.

The disk file is then incorporated onto software stack 155 during compilation of stack 155 source code.

The instructions of the script specify the list of locations of the resolved symbols in buffer memory 129 which are to be XOR-ed to recover a missing symbol and the location in buffer memory 129 where the recovered missing symbol (result of XOR) is to be saved. Each script also has an end of script command, so that script execution terminates at the end of the correct script and before the beginning of the next contiguous script. The semantics of this script language are described later, in connection with Table 2.

In the event of single or dual storage elements 140 failure(s), storage controller 120 determines which storage element failure case is applicable. Mapping engine 124 determines the corresponding storage elements 140 LBAs (140p, 140q and 140a-140h) for the corresponding volume and host 110 LBAs. For cases in which no storage elements 140 have failed and a write operation is requested, mapping engine 124 specifies the offset (start of the relevant script) in table 128 for the script that corresponds to a dual failure by storage elements 140p and 140q via a data packet that is known as a RAID 6 buffer command.

Table 1 is the format for a RAID 6 buffer command that mapping engine 124 sends to enhanced parity generation and data regeneration system 126.

TABLE 1

Format of a RAID 6 buffer command

| # | Field Name | Size (Bytes) | Description |
|---|---|---|---|
| 1 | Opcode | 2 | Will be set to R6_XOR_BUF_CMD or R6_SCRUB_BUF_CMD to indicate RAID 6 buffer command nexus |
| 2 | Main_NexusPtr | 2 | A pointer to the longform nexus, which contains or will contain a full RAID 6 stripe |

TABLE 1-continued

Format of a RAID 6 buffer command

| # | Field Name | Size (Bytes) | Description |
|---|---|---|---|
| 3 | P_NexusPtr | 2 | A pointer to the shortform nexus that contains the P parity |
| 4 | Q_NexusPtr | 2 | A pointer to the shortform nexus that contains the Q parity |
| 5 | Scratch_NexusPtr | 2 | A pointer to the nexus (either long or short form), which is used to hold intermediate XOR results |
| 6 | XorSeqNum | 2 | The Entry number in Table 128, from which the enhanced parity and data regeneration system 126 starts executing the XOR sequence needed for this RAID 6 Buffer command. |

The buffer command (opcode=R6_XOR_BUF_CMD) instructs enhanced parity and data regeneration system 126 to execute a specified script (specified by xorseqNum) located in table 128. The entry location in table 128 for the start of the script to be executed is specified in the xorseqNum field. The nexus pointers indicate the start of each respective nexus in nexus table 130. The main nexus pointer holds the buffer memory 129 block addresses for data, the P-nexus pointer holds the buffer memory 129 block addresses for P parity, the Q-nexus pointer holds the buffer memory 129 block addresses for Q parity, and the scratch nexus pointer holds buffer memory 129 block addresses for intermediate data and parity calculations. Enhanced parity and data regeneration system 126 proceeds to process each command located in table 128 until the end-of-script is reached. At that point, all of the missing symbols caused by a dual drive failure or an update to parity have been regenerated or reconstructed in buffer memory 129.

Table 2 specifies the XOR sequence entry format in table 128.

TABLE 2

XOR sequence entry data format

| # | FieldName | Size (Bytes) | Description |
|---|---|---|---|
| 1 | Flags | 1 | |
| | SubfieldName | Bit Positions | |
| | 1.0 Reserved | 7 | Reserved. |
| | 1.1 NOP | 6 | A 1 indicates No-operation and the remaining flag bits and fields should be treated as "don't care". |
| | 1.2 SetSectorCount | 5 | A 1 indicates that the forthcoming SectorCount_Offset field specifies the XOR-command size in sectors for forthcoming XOR-operations. |
| | 1.3 BeginOfChain | 4 | A 1 indicates that this is the beginning of XOR chain. When this bit is set, the destination nexus pointer is reset to null. |
| | 1.4 EndOfScript | 3 | A 1 indicates that this is the last operation in the list of XOR operations associated with a buffer command. |
| | 1.5 Destination | 2 | A 0 indicates that this entry specifies a source. A 1 indicates that this entry specifies a destination, the destination nexus is set to point to what is specified by NexusSelect. |

TABLE 2-continued

XOR sequence entry data format

| # | FieldName | Size (Bytes) | Description |
|---|---|---|---|
| 1.6 | NexusSelect | 1:0 | 00 selects Main_Nexus<br>01 selects P_Nexus<br>10 selects Q_Nexus<br>11 selects Scratch_Nexus |
| 2 | SectorCount_Offset | 2 | When SetSectorCount is set to zero, this field specifies the sector offset in the selected nexus from where a RAID symbol begins. If SetSectorCount is set to one, this field specifies XOR command size in sectors for forthcoming XOR-operations. |
| 3 | BlockOffset | 1 | This field specifies the offset into the list of blocks in the selected nexus where the symbol begins. This field is valid only when SetSectorCount is set to zero. |

Each entry in table 128 is treated as an "instruction" by enhanced parity and data regeneration system 126. A script is a set of chains, where a chain is a series of instructions for the same destination block addresses; therefore, each chain has a fixed SectorCount value and Destination symbol address.

In operation, enhanced parity generation and data regeneration system 126 reads the first instruction located in table 128 and executes the instruction. Parity generation and data regeneration system 126 proceeds to the next consecutive instruction entry in table 128 and executes that instruction. The process continues until an end of script instruction is reached. A change in symbol size (SetSectorcount bit is set and SectorCount_Off set is equal to new symbol size) or destination represents the start of a new chain. For example, the script in table 128 may look like the following example, shown in Table 3 below.

TABLE 3

An example RAID interpretive script where each group of three fields is an instruction

| | Code (binary) | Description |
|---|---|---|
| Instruction | 0010 0000<br>0000 0000 1000 0000<br>0001 0101 | SetSectorCount = 1<br>SectorCount_Offset = 128<br>Begin of chain = true;<br>Set Destination D1,<br>DestNexus = P_nexus |
| Instruction | 0000 0000 | Set Source Symbol S1,<br>SourceNexus = Main_nexus |
| | 0000 0000 0000 0000<br>0000 0000 | SectorCount_Offset = 0<br>BlockOffset = 0 |
| Instruction | 0000 0000 | Set Source Symbol S2;<br>SourceNexus = Main_nexus |
| | 0000 0001 0000 0000<br>0000 1000 | SectorCount_Offset = 256<br>BlockOffset = 8 |
| Instruction | 0000 0000 | Set Source Symbol S3;<br>SourceNexus = Main_nexus |
| | 0000 0000 1000 0000<br>0000 1100 | SectorCount_Offset = 128<br>BlockOffset = 4 |
| Instruction | 0000 1000 | Set Source Symbol S4;<br>SourceNexus = Main_nexus; end of script = true |
| | 0000 0001 1000 0000<br>0000 1100 | SectorCount_Offset = 384<br>BlockOffset = 12 |
| Instruction | 0001 0110 | //Next chain<br>Begin of chain = true; Set Destination D2, DestNexus = Q_nexus |

TABLE 3-continued

An example RAID interpretive script where each group of three fields is an instruction

| Code (binary) | Description |
|---|---|
| 0000 0000 0000 0000<br>0000 0000 | SectorCount_Offset = 0<br>BlockOffset = 0 |

In this example (which shows only the last chain of the script), the chain instructs enhanced parity and data regeneration system 126 to XOR S1 ^ S2 ^ S3 ^ S4 and put the result into D1. Note that the addresses of S1 through S4 reside in the Main_nexus (the actual nexus number is specified by the RAID 6 buffer command) in nexus table 130 and the D1 address resides in the P_nexus the actual nexus number is specified by the RAID 6 buffer command) in nexus table 130.

The BlockOffset operand allows enhanced parity and data regeneration system 126 to operate at a higher performance by removing the otherwise required block offset calculation; however, this is not required for the invention to be operable.

The previous example assumes a four-input hardware XOR architecture and four symbols. However, the script method of generating parity and/or data provides an abstraction layer, such that the hardware architecture is independent of the algorithm. For example, for a two-input hardware architecture, enhanced parity and data regeneration system 126, using the previous example, the result of S1 ^ S2 is stored in D1, then the result of D1 ^ S3 is stored into D1 and, finally, the result of S4 and D1 is stored in D1 as the final result. In a four-input hardware architecture and an eight symbol example, enhanced parity and data regeneration system 126 may perform S1 ^ S2 ^ S3 ^ S4 and store the result into D1 then perform the operation: D1 ^ S5 ^ S6 ^ S7 and store that result into D1 and, finally, perform the operation D1 ^ S8 to obtain the final result. Other hardware architectures and algorithms may be performed by using this system, as may be appreciated by those skilled in the art.

Regardless of the hardware architecture for the RAID system or the RAID algorithms themselves, the invention described herein provides a method for scripting RAID algorithms and brings in a layer of abstraction between hardware architectures and RAID algorithms.

While the invention has been described in detail in connection with the exemplary embodiment, it should be understood that the invention is not limited to the above disclosed embodiment. Rather, the invention can be modified to incorporate any number of variations, alternations, substitutions, or equivalent arrangements not heretofore described, but which are commensurate with the spirit and scope of the invention. Accordingly, the invention is not limited by the foregoing description or drawings, but is only limited by the scope of the appended claims.

What is claimed as new and desired to be protected by Letters Patent of the United States is:

1. A storage system, comprising:
   a plurality of storage elements for storing information comprising data and a parity;
   a storage controller for controlling transfer of said information between said plurality of storage elements and at least one host, said storage controller comprising:
   a parity unit comprising a script table for storing as a plurality of scripts, each of said scripts defining a set of relationships between said parity and said data, and a nexus table for storing a plurality of nexuses, each nexus comprising a plurality of sector addresses in said plurality of storage elements;

a computer system coupled to said parity unit for creating said plurality of scripts;

a mapping engine coupled to said parity unit for mapping an address asserted by said at least one host into an address space of said plurality of storage elements and for identifying one of said plurality of scripts stored in said script table by issuing a buffer instruction to said parity unit when said storage controller receives a write command and write data from said at least one host; and a buffer, for storing information in transit between said at least one host and said plurality of storage elements, wherein each script comprises a set of instructions and respectively corresponds to a failure mode of a set of at least one failed storage elements, such that said parity unit is capable of regenerating information previously stored on the set of at least one failed storage element by executing said set of instructions, each instruction in each script including at least a first field for selecting one of said nexuses in said buffer instruction, the first field comprising:

a first subfield for indicating whether to treat said instruction as a no operation (NOP) instruction;

a second subfield for indicating whether said second field stores said sector address offset or said number of sectors;

a third subfield for indicating whether said instruction corresponds to a beginning of a chain of exclusive OR operations;

a fourth subfield for indicating whether said instruction corresponds to a last instruction in said script;

a fifth subfield for indicating whether said instruction is associated with a source or a destination; and a sixth subfield for selecting one of the plurality of nexuses in a buffer instruction.

2. The storage system of claim 1, wherein each relationship comprises a plurality of exclusive-OR (XOR) operations between said data and said parity.

3. The storage system of claim 1, wherein said parity unit executes instructions in said one of said plurality of scripts to generate parity associated with said write data.

4. The storage system of claim 1, wherein said buffer instruction comprises:

an operational code identifying said buffer instruction;

a pointer to a first nexus corresponding to a complete stripe of said plurality of storage elements;

a set of pointers to a set of second nexuses corresponding to parity information;

a pointer to a nexus for holding intermediate calculation results; and an identifier corresponding to one of said plurality of scripts stored in said script table.

5. The storage system of claim 4, wherein each instruction in each script further comprises:

a second field for storing either:

a sector address offset associated with a RAID symbol in said selected one of said nexuses in said buffer instruction, or a number of sectors to be part of an exclusive-OR operation; and a third field for storing a block address offset associated with a RAID symbol in said selected one of said nexuses in said buffer instruction.

6. The storage system of claim 4, wherein said parity unit maintains a P-parity and a Q-parity, and said set of pointers to said set of second nexuses include a nexus associated with said P-parity and a nexus associated with said Q-parity.

7. The storage system of claim 1, wherein said nexus table include a plurality of short form nexuses for storing a relatively small number of sector addresses and a plurality of long form nexuses for storing a relatively large number of sector addresses.

8. The storage system of claim 7, wherein each long form nexus stores 2048 sector addresses.

9. The storage system of claim 7, wherein each short form nexus stores 128 sector addresses.

* * * * *